United States Patent [19]
Malcolmson

[11] Patent Number: 5,116,013
[45] Date of Patent: May 26, 1992

[54] MIRROR MOUNTING MECHANISM

[75] Inventor: Kirk Malcolmson, Flat Rock, Mich.

[73] Assignee: Mirror Lite Co., Rockwood, Mich.

[21] Appl. No.: 685,462

[22] Filed: Apr. 2, 1991

[51] Int. Cl.⁵ .............................................. A47G 1/24
[52] U.S. Cl. ................................ 248/484; 248/288.3; 248/485; 359/873
[58] Field of Search ............... 248/479, 549, 485, 486, 248/487, 481, 482, 483, 484, 288.3; 350/637, 636, 639, 631, 604, 634, 632

[56] References Cited

U.S. PATENT DOCUMENTS

| | | | |
|---|---|---|---|
| 2,588,825 | 3/1952 | Goodman | 248/481 |
| 2,704,963 | 3/1955 | Parachek | 248/485 X |
| 3,259,349 | 7/1966 | Lee | 248/485 X |
| 3,644,021 | 2/1972 | Hamby | 248/481 X |
| 4,076,392 | 2/1978 | Suzuki | 248/487 X |
| 4,166,651 | 9/1979 | Vandenbrink | 248/487 |
| 4,830,326 | 5/1989 | Schmidt | 350/632 X |
| 4,856,886 | 8/1989 | Polzer | 350/636 X |
| 4,915,493 | 4/1990 | Fisher | 350/634 |
| 4,938,578 | 7/1990 | Schmidt | 248/479 X |
| 4,998,813 | 3/1991 | Reynolds | 350/632 X |

Primary Examiner—J. Franklin Foss
Attorney, Agent, or Firm—Weintraub, DuRoss & Brady

[57] ABSTRACT

A mirror mounting mechanism for mounting a mirror to a vehicle and preventing mirror movement after the mirror is positioned. A retaining device, which is attached to the mirror and a vehicle mounting bar, is securely tightened in place after the mirror is positioned to prevent the mirror from moving.

4 Claims, 2 Drawing Sheets

MIRROR MOUNTING MECHANISM

BACKGROUND OF THE INVENTION

1. Field of the Invention

The present invention relates to a mounting mechanism for securing a mirror to a vehicular surface. More particularly, the present invention concerns a mounting mechanism for retaining a mirror in a stationary position on a vehicle to enable the driver to view, without distortion, objects disposed beside and behind the vehicle.

2. Prior Art

Maintaining the position of an adjustable vehicular mirror when vibrating, as is caused by vehicle operation, is a functional necessity. This is especially true where the mirrors are mounted at the front end of the vehicle beyond the driver's ability to reach and correct mirror movement while operating the vehicle, such as is encountered with trucks, busses, and the like.

The art has attempted to resolve this problem. For example, U.S. Pat. No. 2,805,600 teaches a rear-view mirror bracket which provides for an adjustable mirror around a center ball joint with adjustable threaded fasteners that hold the mirror in a set position. Threaded fasteners, however, come loose resulting in either replacement or servicing. In either event, though, loosening of the fastener necessarily permits the mirror to vibrate, thus, causing viewing distortion.

U.S. Pat. No. 2,626,771 teaches a rear-view mirror mounted on a tubular support having adjustment members at the ends of the support. However, the reference fails to teach any means to maintain the mirror in the preset position except the built-in tension within the adjustment members. Continued vehicle vibrations and readjustment can destroy the tension.

U.S. Pat. No. 2,856,815 teaches a mirror mounting devices wherein two tubular supports operate in parallel to position a mirror and hold it in place during vehicle operation. The mirror can be easily adjusted, while the two rods hold the position. However, the mirror must be disassembled to service one end of the rods and the vehicular mounting bracket must be serviced at two locations at the other end of the rods.

U.S. Pat. No. 4,500,063 provides a more stable tubular mounting method for mirrors, but adjustment is limited to the one location located at the vehicle mounting bracket.

What is needed, therefore, is a mirror mounting mechanism which is easily adjustable about multiple axes of orientation and which provides secure retention during vehicle operation at the mirror's selected position. It is to this to which the present invention is directed.

SUMMARY OF THE INVENTION

In accordance herewith there is provided a mirror mounting mechanism, which, generally, comprises:
(a) means for pivotally adjusting a mirror assembly, the assembly including a mirror mounted thereon;
(b) a retainer for continuously retaining a mirror assembly in position; and
(c) means for mounting the retainer to a vehicle.

The means for pivotally adjusting the mirror assembly generally, comprises at least two ball-and-socket assemblies removably installed within a mirror assembly and secured in place. The mirror assembly is adjusted to its desired position by using the ball-and-socket assemblies.

The retainer, which continuously retains the adjusted mirror assembly in position, comprises an adjustable positioning rod and a tubular support rod. The adjustable positioning rod is removably attached to one of the ball assemblies as well as to a retaining clamp. The clamp is slidably mounted on the tubular support rod. The tubular support rod is removably attached to the other ball joint assembly at one end and is rotatably inserted in the means for mounting at the other end.

The means for mounting the retainer to the vehicle comprises a bracket or the like.

For a more complete understanding of the present invention reference is made to the following detailed description and accompanying drawings in which like reference numerals designate like parts throughout the figures, in which:

DETAILED DESCRIPTION OF THE PREFERRED EMBODIMENT

Figure 1:
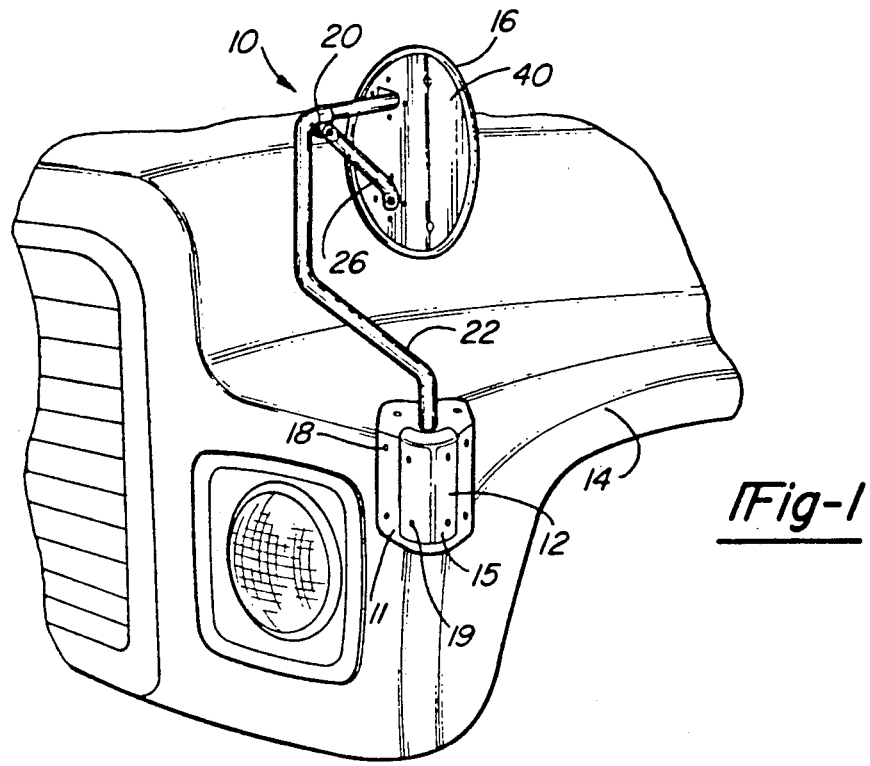
FIG. 1 is a perspective view of the mirror mounting mechanism of the present invention, in use on a left front fender of a vehicle.
Figure 2:
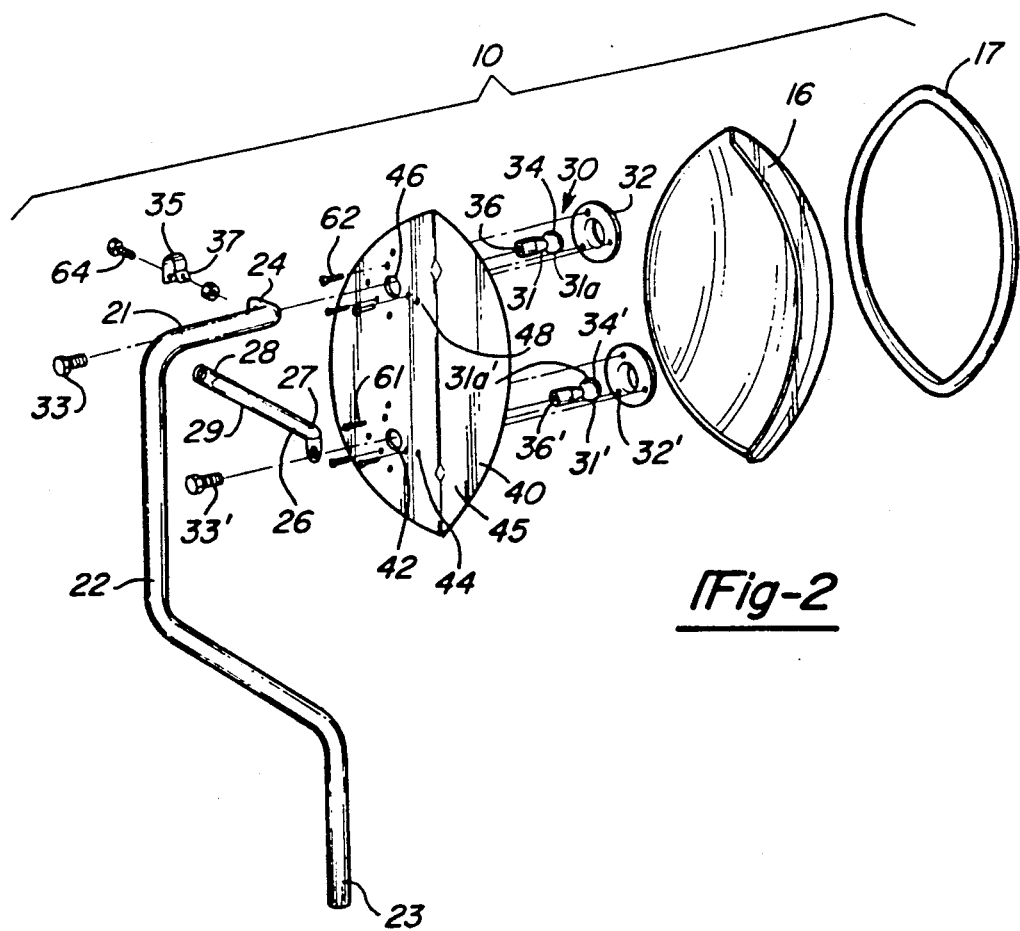
FIG. 2 is an exploded, perspective view of the mirror mounting mechanism of the present invention.

Referring now to the drawings and in particular FIGS. 1 and 2, there is depicted a preferred embodiment of a mirror mounting mechanism 10 of the present invention shown mounted on a vehicle and, specifically, on a vehicle fender 14.

The mounting mechanism 10, generally, comprises:
(a) means 30 for pivotally adjusting a mirror assembly 40 to a desired position;
(b) an adjustable retainer or retaining device 20 for continuously retaining the adjusted mirror assembly 40 in an adjusted position; and,
(c) means 15 for mounting the retaining device 20 to the vehicle fender 14.

As shown in FIG. 2, the means 30 for pivotally adjusting the mirror assembly 40 comprises at least two ball joints 31, 31' having sockets 32, 32' associated therewith. The ball and socket assemblies are removably assembled to a mirror assembly frame 45 and disposed within the mirror assembly 40.

The ball joints 31, 31' are attached at locations 44 and 48 to the mirror assembly frame 45 by a means for fastening, such as screws or the like. The ball joints 31 and 31' each have a ball 31a, 31a' provided at one end 34 and 34', respectively, thereof and a threaded aperture 36, 36' provided at the other end thereof. When the ball joints 31, 31' and the sockets 32, 32' are each assembled to the mirror assembly frame 45, the first ball joint threaded aperture 36 extends through a clearance hole 46 in the frame 45 and the second ball joint threaded aperture 36' extends through a second clearance hole 42.

The adjustable retaining device 20 continuously retains the mirror assembly 40 in its adjusted position. The device 20 comprises an adjustable positioning rod 26 and a tubular support rod 22 each of which are removably attached to the ball joints 31 and 31' by means for attaching such as screws, 33, 33' or the like.

The adjustable positioning rod 26 is defined by a positioning bar 29, a retaining clamp 35 and a means for fastening 64, such as a screw and nut assembly.

The positioning bar 29 is a tubular rod having a flat flange 27 bent at an angle normal to the center line of the bar 29 at a first end and a flat flange 28 in-line with the center line 26 of the bar 29 at the second end thereof. Each flange end 27 and 28 has an aperture formed therethrough. The apertures provide access for the means for fastening 33' and 64, respectively. The first flange end 27 is connected to the second ball-joint 31' by the fastening means 33'.

The second flange end 28 of the positioning bar 29 is connected to the retaining clamp 35 by the means for fastening 64.

The retaining clamp 35 is a U-shaped tension clamp having an aperture 37, 37' at each end to provide access for the means for fastening 64. The retaining clamp 35 removably encircles a top median portion 21 of the tubular support rod 22. The retaining clamp is cooperatively connected to the second flange end 28 of the positioning bar 29 by the means 64 for fastening.

The tubular support rod 22 is an elongated bar having a first end comprising a flattened flange 24 bent substantially perpendicular to the top median portion 21 of the rod 22 and a rounded second end 23 which seats within the means 15 for mounting the retaining device to the vehicle. As shown, the tubular support rod 22 may have a plurality of bends to assist with the positioning of the mirror assembly 40.

Figure 3:
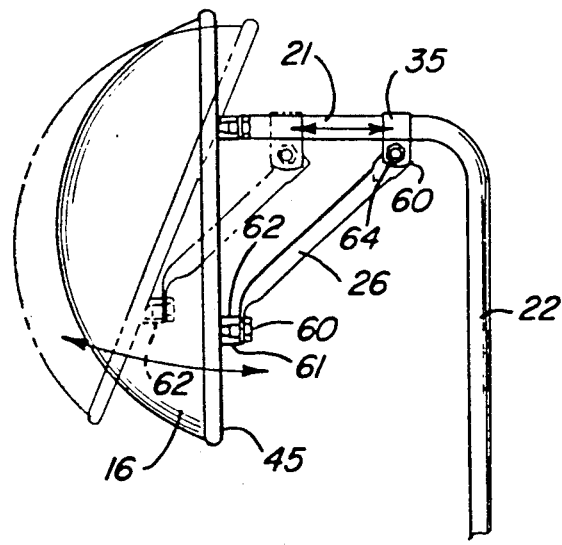
FIG. 3 is a side elevational view of the mirror mounting mechanism, showing the extent of the retainer rod assembly.
Figure 4:
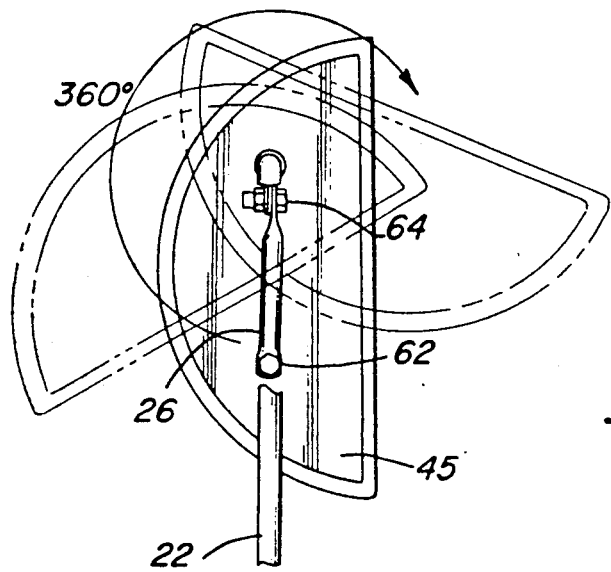
FIG. 4 is a rear elevational view of the mirror mounting mechanism showing 360° mirror assembly rotation.
Figure 5:
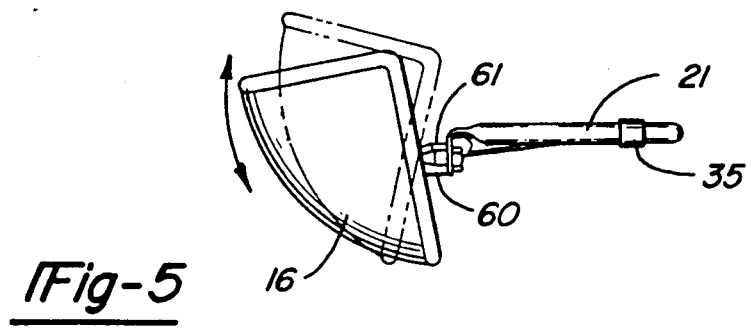
FIG. 5 is a top plan view of the mirror mounting mechanism hereof, depicting the pivotal movement of the mirror assembly about the ball-and-socket assemblies.

As shown in FIG. 3, the retaining clamp 35 changes positions on the top median portion 21 of the tubular support rod 22 to compensate for adjustment of the mirror assembly 40. The positioning rod 26 cooperates with the second ball joint 31' and socket 32' to select the viewing position of the mirror assembly 40. The retaining clamp 35 and the means 64 for fastening are tightened to prevent movement of the retaining clamp 35 on the top median portion and secure the position of the mirror assembly 40.

Referring, again, to FIG. 1, there is depicted therein the means 15 for mounting the retaining device to the vehicle fender 14. As shown, the means 15 includes a base 11, a cover 12, a means 19 for tightening the cover 12 and tubular support rod 22 to the base 11, such as screws or the like, and means 18 for attaching the base to the vehicle. The means for mounting contemplated for use herein is more particularly described in U.S. Pat. No. 4,500,063, the disclosure of which is hereby incorporated by reference. I should be noted, however, that any other suitable mounting designed to accommodate the tubular support bar 22 can be used with the instant invention.

Having, thus, described the invention what is claimed is:

1. A mirror mounting mechanism comprising:
    (a) a first and a second ball-and-socket assembly located within a mirror assembly, the mirror assembly having a top half and a bottom half and including a mirror, the first ball-and-socket assembly projecting through in the top half of the mirror assembly and the second ball-and-socket assembly projecting through in the bottom half of the mirror assembly;
    (b) a retainer for continuously retaining the mirror assembly in its adjusted position, the retainer comprising:
        (1) an adjustable positioning rod having a first end removably attached to the second ball-and-socket assembly and a second end;
        (2) a tubular support rod connected to the positioning rod with a first end removably attached to the first ball-and-socket assembly and a second end removably insertable into means for mounting and being rotatably adjustable therein;
        (3) a retaining clamp slidingly mounted on the tubular support rod, and removably attached to the positioning rod; and
        (4) means for fastening the clamp to the positioning rod;
    (c) means for mounting the retainer to a vehicle.

2. The mirror mounting mechanism of claim 1, wherein the means for mounting the adjustable retaining device to the vehicle comprises:
    (a) a mounting bracket including:
        (1) a base, removably mounted onto the vehicle which provides a seat for the second end of the tubular support rod; and
        (2) a cover, removably mounted onto the base which covers the tubular support rod;
    (b) means for fastening the base to the vehicle; and
    (c) means for attaching the cover to the bracket.

3. A mirror mounting mechanism comprising:
    (a) means for pivotally adjusting a mirror assembly, the assembly including a mirror;
    (b) an adjustable retainer for continuously retaining the mirror assembly in an adjusted position within a vertical plane, the retainer comprising:
        (1) an adjustable positioning rod having a first end removably attached to the means for pivotally adjusting and a second end;
        (2) a tubular support rod connected to the positioning rod with a first end of the support bar removably attached to the means for pivotally adjusting and a second end removably insertable into means four mounting and being rotatably adjustable therein;
        (3) a retaining clamp slidingly mounted on the tubular support rod, and removably attached to the positioning rod;
        (4) means for fastening the clamp to the positioning rod; and
    (c) means for mounting the adjustable retainer to a vehicle.

4. The mirror mounting mechanism of claim 3, wherein the means for mounting the adjustable retainer to the vehicle comprises:
    (a) a mounting bracket including:
        (1) a base, removably mounted onto the vehicle which provides a seat for the second end of the tubular support rod; and
        (2) a cover removably mounted onto the base which covers the tubular support rod;
    (b) means for fastening the base to the vehicle; and
    (c) means for attaching the cover to the bracket.

* * * * *

UNITED STATES PATENT AND TRADEMARK OFFICE
CERTIFICATE OF CORRECTION

PATENT NO. : 5,116,013

DATED : May 26, 1992

INVENTOR(S) : Kirk Malcomson

It is certified that error appears in the above-identified patent and that said Letters Patent is hereby corrected as shown below:

On the title page, Item [75]:

In the Inventor's name delete "Malcolmson" and replace with --Malcomson--.

Signed and Sealed this

Thirty-first Day of August, 1993

*Attest:*

BRUCE LEHMAN

*Attesting Officer*     *Commissioner of Patents and Trademarks*